United States Patent [19]
Kinzer et al.

[11] 3,857,755
[45] Dec. 31, 1974

[54] FUEL PIN SECURING APPARATUS

[75] Inventors: Jackson E. Kinzer, Woodland Hills; Martin A. Fallandy, Canoga Park, both of Calif.

[73] Assignee: Rockwell International Corporation, El Segundo, Calif.

[22] Filed: Mar. 11, 1971

[21] Appl. No.: 123,347

[52] U.S. Cl............... 176/78, 176/75, 176/76, 176/79
[51] Int. Cl............ G21c 3/04, G21c 3/32
[58] Field of Search............. 176/76, 78, 79, 81, 75

[56] References Cited
UNITED STATES PATENTS

| | | | |
|---|---|---|---|
| 3,105,026 | 9/1963 | Dickson | 176/78 X |
| 3,113,083 | 12/1963 | Silvester | 176/75 |
| 3,137,635 | 6/1964 | Moore et al. | 176/78 X |
| 3,150,057 | 9/1964 | Monson et al. | 176/78 |
| 3,291,698 | 12/1966 | Fortescue | 176/81 X |
| 3,303,099 | 2/1967 | Johnston | 176/79 |
| 3,365,372 | 1/1968 | Swanson et al. | 176/79 X |
| 3,505,170 | 4/1970 | Flowers et al. | 176/78 |

*Primary Examiner*—Carl D. Quarforth
*Assistant Examiner*—Roger S. Gaither
*Attorney, Agent, or Firm*—L. Lee Humphries; Henry Kolin

[57] ABSTRACT

A fuel pin hold-down and spacing apparatus for use in nuclear reactors is disclosed. Fuel pins forming a hexagonal array are spaced apart from each other and held-down at their lower end, securely attached at two places along their length to one of a plurality of vertically disposed parallel plates arranged in horizontally spaced rows. These plates are in turn spaced apart from each other and held together by a combination of spacing and fastening means. The arrangement of this invention provides a strong vibration free hold-down mechanism while avoiding a large pressure drop to the flow of coolant fluid. This apparatus is particularly useful in connection with liquid cooled reactors such as liquid metal cooled fast breeder reactors.

6 Claims, 6 Drawing Figures

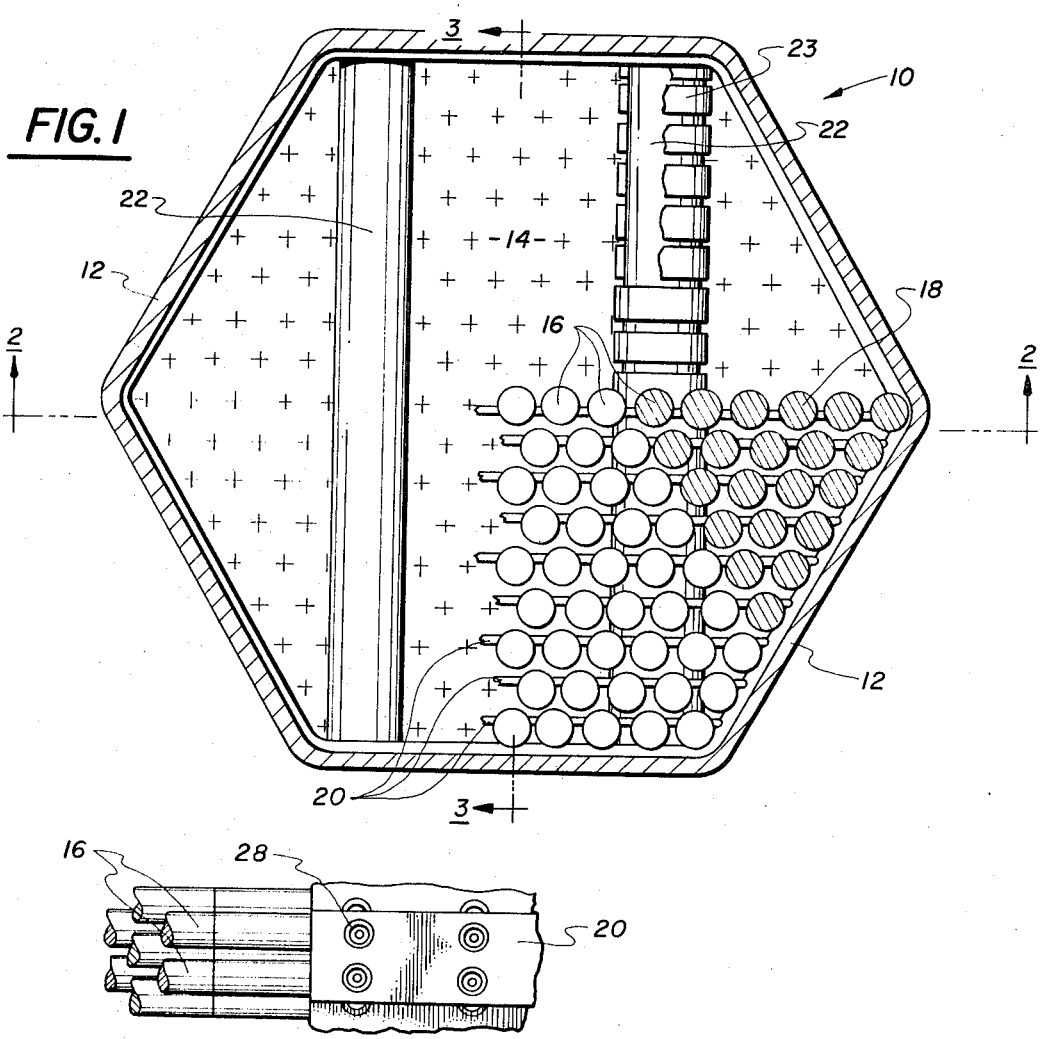
FIG. 1
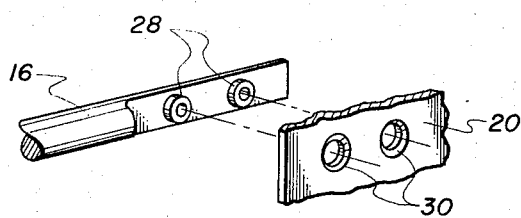
FIG. 5
FIG. 6
FIG. 4
INVENTORS
JACKSON E. KINZER
MARTIN A. FALLANDY
BY Robert M. Davidson
ATTORNEY

FUEL PIN SECURING APPARATUS

BACKGROUND OF THE INVENTION

A. Field of the Invention

This invention relates to the field of nuclear reactors which utilize a plurality of fuel containers disposed in a geometric array. More particularly, the invention relates to a means for individually spacing and holding in an operating position a plurality of fuel pins which are positioned with fuel elements in a nuclear reactor.

Fuel elements containing a plurality of fuel pins which in turn contain active nuclear fuel are commonly known and used in the design of nuclear reactors. Normally, a gaseous or liquid coolant is passed through the element and around the several pins to extract the heat generated during operation.

The use of the fuel elements fuel pin design is of particular interest in liquid cooled nuclear reactors such as liquid metal cooled breeder reactors. When liquid metal is used as the coolant, the design of the fuel pin structure is of critical importance. The pins must be designed to minimize coolant flow resistance while at the same time the pins must maintain their structural integrity and be free of excessive vibrations. Spacing of the pins is also of critical importance. Jamming of pins against each other could cause localized loss of coolant flow resulting in overheating and reactor shutdown. In addition, provisions must be made for the fuel pins to swell during operation due to thermal and nuclear forces. A great deal of attention has been given to the design of fuel pin materials, shapes and type of wrapping and spacing materials. To date, however, there still remains a need in that art for a simple yet rugged means to hold the bottom portion of the fuel pins in the element and to provide proper spacing without creating excessive pressure drop in coolant flow.

B. Description of the Prior Art

The conventional manner of supporting an array of fuel pins within a fuel element is illustrated in U.S. Pat. No. 3,505,170 to Flowers et al. Each fuel pin has a fitting which is slotted across its diameter. The pins are aligned with their slots oriented in a common direction and are fitted over and welded to parallel rows of spacer strips.

The spacer strips are fitted with slots of an adapter plate which is held in the fuel assembly by supporting bars. Structural integrity is a major problem with center-slotted fuel pins welded to spacer strips because to support an adequate weld, the spacer strip must be relatively thick which in turn means that a thick portion of metal must be cut from the center of the fuel pin, leaving only thin edge portions for support. This is a severe problem in liquid metal cooled fast breeder reactors where the fuel pins have small diameters on the order of from about 5 to about 7 millimeters. Accurate spacing of the individual fuel pins along the spacer strips during welding requires added tooling and is a complicated production process.

A non-welded slotted hold-down assembly is described in U.S. Pat. No. 3,150,057 to Monson et al. There the lower connector portions of the fuel pins contain a T-shaped slot. The pins are arranged in parallel rows with their slots oriented in a common direction. Parallel rows of T-shaped hold-down strips are keyed in the slots of the fuel pins with one T-shaped spacer bar for each row of pins.

This hold-down system shares with the slot-welded system the common problem of achieving spacing during manufacture and achieving structural integrity in a fitting having the central portion cut away. In addition, T-shaped hold-down fittings are subject to vibration and fatigue caused by vibrations when placed in a stream of liquid coolant. Consequently T-shaped hold-down fittings are not well suited for use in fast breeder reactors cooled by liquid metals and which normally use small diameter pins.

A third type of hold-down configuration, illustrated by U.S. Pat. No. 3,303,099 to Johnston, uses pins having pegs or rivets axially projecting from their lower end which are secured to a predrilled, horizontally disposed support plate. Predrilling of the support plate alleviates spacing difficulties in manufacture. However, the horizontally disposed support plate prevents the use of this arrangement in systems where it is desired to flow coolant elements from beneath the pins. Furthermore, large diameter pins must be used in this arrangement in order to provide sufficiently strong pegs. Also, safety requirements imposed in many reactor installations would place limitations on the use of a vertically riveted system because of lack of redundancy of hold-down and its susceptibility to fatigue by vibrations.

In view of the problems associated with prior fuel pin hold-down devices and the importance of such a device in the operation of today's power reactors, there exists in the art an urgent need for an improved hold-down device.

SUMMARY OF THE INVENTION

In accordance with this invention, a readily fabricated fuel pin hold-down spacing device is provided for use in nuclear reactors. Fuel pins are made with a notched portion at their lower end having at least two fastener studs protruding therefrom. The pins are then fitted to spacing plates which contain matching holes to receive fasteners of the pins. Tie rods and spacers are provided to join the individual spacer plates and hold them in a tight parallel array within the fuel element. The present invention has many advantages including; case of construction, strength, durability, redundancy from failure and freedom from excessive vibrations.

Accordingly, the primary objects of the present invention are:

to provide an improved hold-down device for nuclear reactor fuel pins;

to provide an improved easily fabricated fuel pin hold-down and spacing device for liquid cooled nuclear reactors and to provide an improved fuel pin spacing and hold-down device for liquid metal cooled nuclear reactors.

These and other objects and advantages of the invention will become more readily apparent from consideration of the following detailed description of the preferred embodiments of the invention wherein reference is made to the attached drawings.

BRIEF DESCRIPTION OF THE DRAWINGS

FIG. 1 is a horizontal cross section through an array of fuel pins spaced and held according to the present invention within a fuel element.

FIG. 4 is an exploded view partially cutaway showing in detail the connection of fuel pins to hold-down plates or spacers.

FIG. 5 is a schematic drawing illustrating a plate-side view of the pin hold-down plate connection.

FIG. 6 is a schematic drawing illustrating a side view of the connection as shown in FIG. 5.

DETAILED DESCRIPTION OF THE PREFERRED EMBODIMENTS

Figure 2:
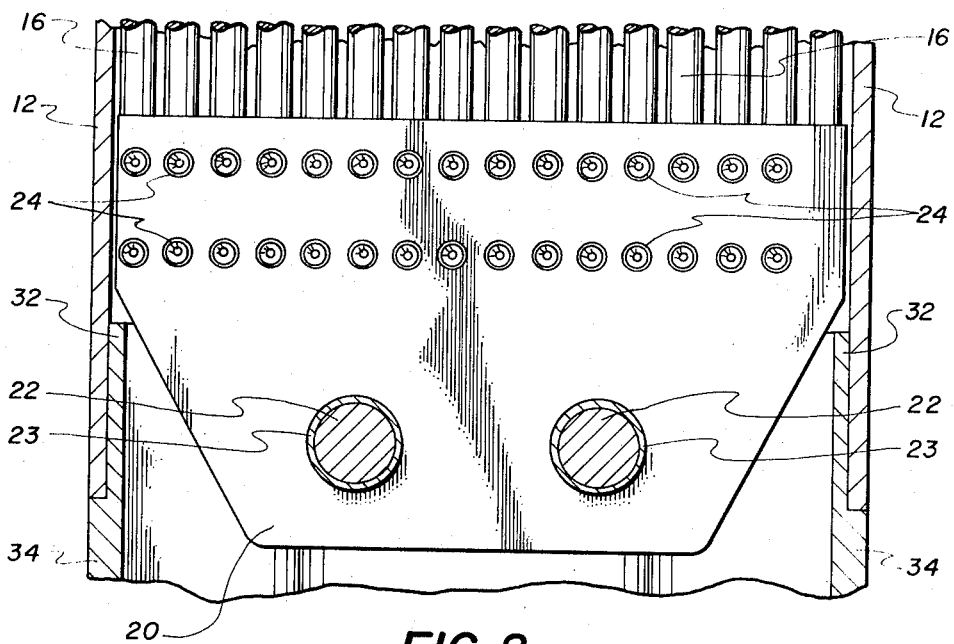
FIG. 2 is a vertical cross section taken along line 2—2 of FIG. 1.

Referring now to the drawings, FIG. 1 shows a cross section through a single nuclear reactor fuel element 10. This element comprises a casing 12 which contains within its length an array 14 of fuel pins 16 filled with a nuclear fuel 18. Normally fuel element 10 is hexagon shaped as shown so that a plurality of elements may be tightly grouped together to form a reactor core. As a consequence, the fuel pin array is also hexagonal in shape forming rows of pins in three directions parallel to opposite sides of casing 12. Parallel members 20 serving the combined functions of spacing and supporting the fuel pins are associated with adjacent rows of pins 16. Members 20 are, in turn, spaced and supported by tie rods 22 and spacers 23 as will be explained hereinafter.

Figure 3:
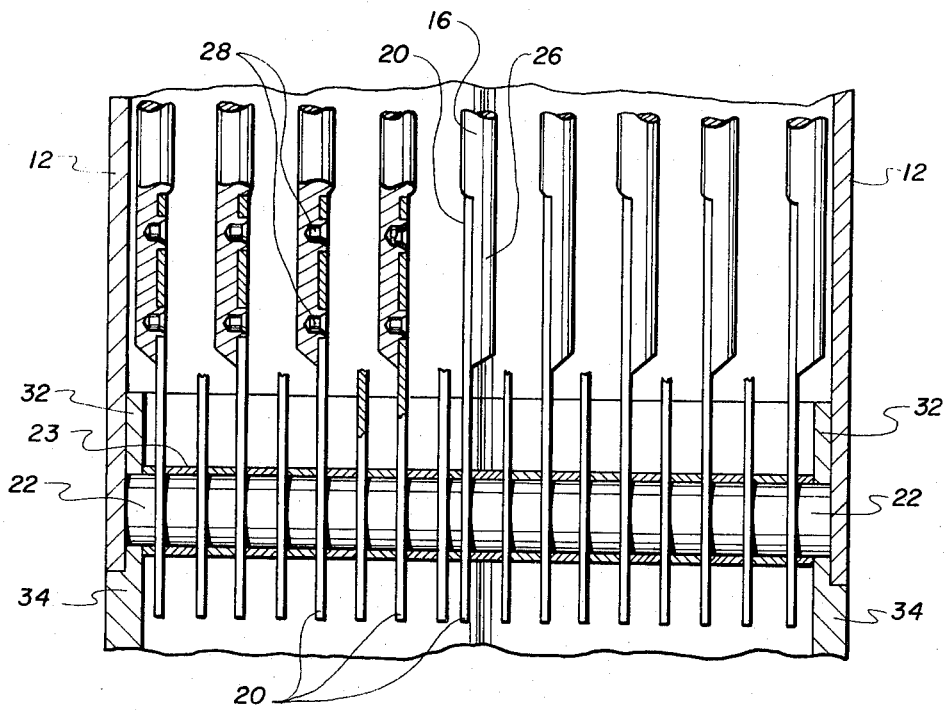
FIG. 3 is a vertical cross section taken along line 3—3 of FIG. 1.

FIG. 2 is a cross section taken along line 2—2 of FIG. 1 and shows a row of fuel pins 16 each attached at two points 24 to support spacer member 20. FIG. 2 also shows a preferred shape for spacer members 20, the bottom portion narrowed. Passing through support 20 are connecting rods 22 surrounded by spacers 23. The cooperation between these elements is clearly illustrated in FIG. 3 which is a partial cutaway cross section taken along line 3—3 of FIG. 1 illustrating in greater detail the connection of pins 16 to spacer members 20. Pins 16 are seen as formed with a bottom portion 26 which is cutaway on one side. For purposes of illustration only a portion of pins 16 are shown. The cutaway bottom portion 26 of pins 16 is formed so as to receive support members 20. The pins may be initially machined so as to include portions 28 which protrude from the cutaway surface of section 26. These stud portions are normally drilled out so that the end of the stud is hollow, thus facilitating mechanical crimping. FIG. 4 shows the method of construction. Pins 16 are positioned such that stud portions 28 are received in holes 30 which are predrilled in members 20. Then, the ends of stud portions 28 are mechanically deformed to create a rigid connection between pins 16 and support members 20. Returning now to FIGS. 2 and 3, rods 22 which hold together support plates 20 are shown as attached to a shoulder portion 32 of section 34 of the fuel element housing which in turn is connected to section 12 of the fuel element housing. Normally, the tie rod and shoulder connections will be made by welding the various pieces together. Spacers 23 are placed around tie rod 22 and between each of members 20.

FIGS. 5 and 6 further illustrate the fuel pin support of this invention. FIG. 5 shows a detailed view of a small number of pins 16 as attached to support members 20. FIG. 6 shows the same group of pins from a different view.

The hold-down and spacing mechanism offers several important advantages over previously used devices. Its uncomplicated construction makes fabrication operations safe and economical. Unlike center slotted arrangements, the location of support plates 20 along one side of cutaway portion 26 of pins 16 leaves a large portion of the pin for mechanical stability. Also, attachment of pins 16 at two locations 24 to support plates 20 provides a strong vibration free connection. In addition, the use of a double attachment gives redundant support in the case of a failure of a single stud.

Though the invention has been described in terms of preferred embodiments and specific illustrations, it will be obvious to those of ordinary skill in the art that various modifications and adaptations of the invention are possible without departure from the spirit and scope of the invention as claimed hereinbelow. For example, whereas the invention has been primarily described with reference to liquid metal cooled fast breeder reactors, it is clear that the invention has application in other forms of nuclear reactors.

We claim:

1. A fuel element assembly for use in nuclear reactors comprising an elongated hexagonal, vertically-oriented metallic housing, a bundle of elongated, cylindrical fuel-containing rods disposed in a triangular array within said housing, including parallel rows of rods extending lengthwise of said housing, each of said cylindrical fuel rods having at its lower end a solid portion, said solid portion having a section partially cut away from the exterior periphery thereof so as to form an outwardly facing flat vertical surface on the remaining part of said solid portion, said remaining part having a thickness greater than one-half the original thickness of said solid portion, spacer strips extending the length of said rows and attached to each of said rods in said rows at a plurality of locations along the length of said outwardly facing flat vertical surface, means to hold said strips in a predetermined spaced relationship in a direction normal to said rows, and means to hold said strips at a predetermined position along the length of said housing.

2. A fuel element according to claim 1 wherein said means to hold said strips at a predetermined position along the length of said housing comprises a plurality of connecting rods which pass through said strips at a direction normal to said strips and which are attached at their ends to said housing.

3. The fuel element of claim 2 wherein said connecting rods are surrounded with a plurality of spacers individually disposed in abutting relationship to said strips whereby each of said strips has a spacer on each side thereof.

4. The fuel element assembly of claim 1 wherein each of said fuel rods contain a plurality of stud portions spaced along and extending from said flat vertical surface and wherein each of said stud portions is adapted to be received within corresponding holes in said spacer strips.

5. The fuel element assembly of claim 4 wherein said stud portions are hollow at their projecting ends, extending through said holes in said spacer strips and are deformed at their ends thereby forming a rigid attachment of said pins to said strip.

6. The fuel element assembly of claim 4 wherein each of said pins contains two stud portions.

* * * * *